Sept. 25, 1945.  A. E. COX  2,385,565
CLIP OR FASTENER
Filed Nov. 9, 1943

Inventor
Arthur E. Cox,
By McMorrow & Berman
Attorneys

Patented Sept. 25, 1945

2,385,565

UNITED STATES PATENT OFFICE 2,385,565

CLIP OR FASTENER

Arthur E. Cox, Camp Barkeley, Tex.

Application November 9, 1943, Serial No. 509,588

1 Claim. (Cl. 24—218)

This invention relates to a spring clip or fastener to be employed in lieu of set screws and similar devices, and has for the primary object the provision of an efficient and inexpensive clip or fastener which will secure against separation one object from another object, wherein the objects fit one within the other and which may be easily and quickly applied and removed without the use of a tool.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a front elevation, partly in section, illustrating one object fitted within another object and secured thereto by a fastener or clip constructed in accordance with my invention.

Figure 1:
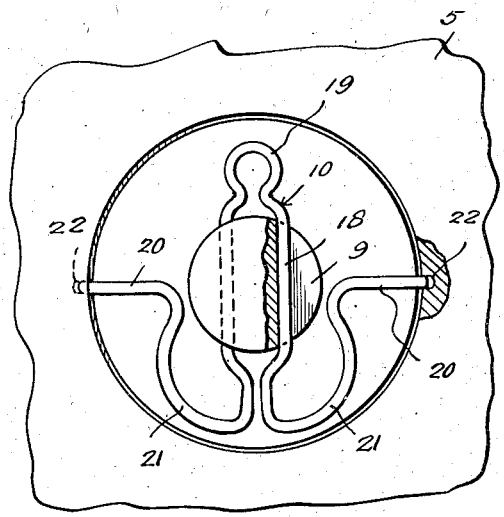

Referring in detail to the drawing, the numeral 5 indicates an object which may be of any character provided with a bore 6 to receive an object 7 in the form of a pin. The object 5 at one end of the bore 6 is provided with a recess 8 in which one end of the pin 7 is confined. To secure against displacement of the object or pin 7 from the object 5, the pin 7 is provided adjacent one end or the end confined within the recess 8 with parallel grooves 9 to receive a spring clip or fastener 10 constructed in accordance with the present invention.

The spring clip or fastener 10 includes straight parallel portions 18 joined by a spring connecting portion 19. The spring clip or fastener further includes spring arms 20 extending oppositely to each other and are connected to the parallel straight portions 18 by curved spring portions 21. The fastener or clip 10 may be constructed from a single length of resilient metal first bent upon itself to form the connecting portion 19, then bent to form the parallel straight portions 18 and then bent to form the curved connecting portions 21 and then bent to form the arms 20.

The resilient connecting portion 19 of the fastener or clip will permit the parallel portions 18 to be manually spread apart so that they may be arranged within the grooves 9 locating the connecting portion 19 and the connecting portions 21 in the recess 8 of the object 5 and with the ends of the arms bearing against the walls of the recess 8.

Sockets 22 are formed in the walls of the recess 8 to receive the ends of the arms 20, the latter being forced into said sockets by the spring action within the connecting portions 21. With the parallel portions 18 fitted within the groove 9 and the ends of the arms within the sockets 22, the objects 5 and 7 will be securely fastened together against separation.

Figure 2:
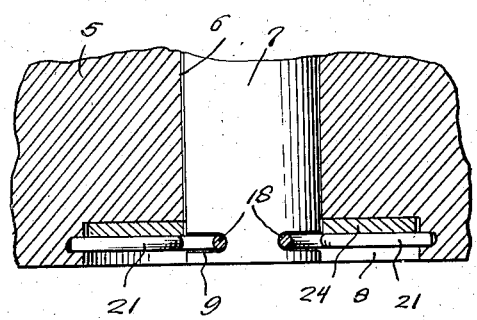
Figure 2 is a fragmentary longitudinal sectional view illustrating the connection of the clip or fastener with one of the objects and located within a recess provided in said latter-named object.

It will be noted that the spring clip or fastener 10 when applied as shown in Figures 1 and 2 will lie wholly within the recess 8 and thereby will not provide an obstruction outwardly of either of the objects and consequently will be protected by said objects from injury or damage.

Figure 3:
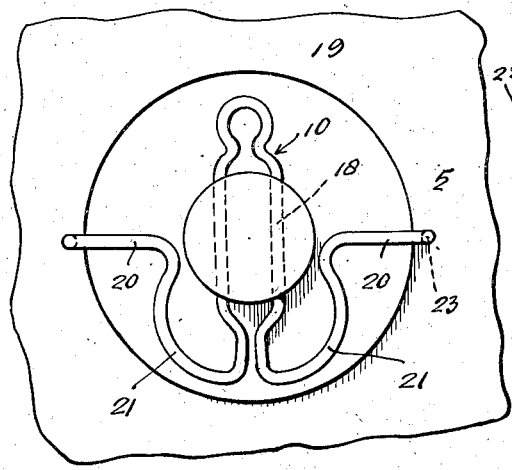
Figure 3 is a side elevation illustrating a modified form of my invention applied to objects one fitting within the other.
Figure 4:
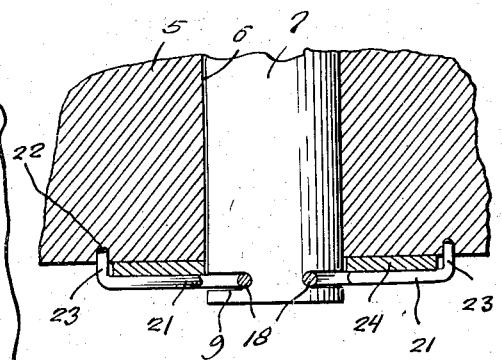
Figure 4 is a fragmentary longitudinal sectional view illustrating a modified form of the invention.

Referring to my modified form of the invention as shown in Figures 3 and 4, the recess 8 in the object 5 is omitted and the sockets 22 are arranged in one face of the object 5 and the pin or object 7 having the grooved end arranged beyond said face of the object 5. The spring clip or fastener is arranged on the pin or object 7 as heretofore described in connection with Figures 1 and 2 of the drawing and in this instance the fastener or clip has right angularly disposed extensions 23 formed on the arms 20 adapted to engage in the sockets 22 in the face of the object 5. The fastener or clip thus applied to the object 5 and the pin 7 will prevent separation of said parts.

As shown in Figures 2 and 4 a washer 24 may be arranged between the spring clip or fastener and the object 5. Thus it will be seen that a very inexpensive spring clip or fastener has been provided and which may be quickly applied to either object and will be self-sustaining in position on said objects and prevent one object from detaching from the other object.

The connecting portions 19 and 21 of the clip or fastener 10 provide restrictions at the ends of the straight parallel portions 18 to prevent the latter from being moved accidentally out of the grooves 9 in an endwise direction of said straight portions 18.

While I have shown and described the preferred embodiment of my invention, it will be understood that minor changes in construction, combination and arrangement of parts may be made without departing from the spirit and scope of the invention claimed.

Having thus described the invention, what I claim is:

As a new article of manufacture, a spring clip formed of a single length of wire bent to provide a flat body having straight parallel portions adapted for seating in grooves formed in opposite sides of an object, a resilient portion joining said parallel portions at one of their ends, inwardly offset portions formed at the opposite ends of said parallel portions, other resilient portions extending outwardly in opposite directions from the ends of said inwardly offset portions and curving backward to points in the plane of the transverse centers of said parallel portions, arms extending outwardly in opposite directions from the ends of said other resilient portions and in right angular relation with respect to said parallel portions, and extensions formed at the free ends of said arms, at right angles to the plane of said body, to seat in sockets formed in a second object.

ARTHUR E. COX.